(12) United States Patent
Karjala et al.

(10) Patent No.: US 11,098,183 B2
(45) Date of Patent: Aug. 24, 2021

(54) ETHYLENE-BASED POLYMERS WITH GOOD PROCESSABILITY FOR USE IN MULTILAYER FILMS

(71) Applicant: Dow Global Technologies LLC, Midland, MI (US)

(72) Inventors: Teresa P. Karjala, Lake Jackson, TX (US); Jose Ortega, Lake Jackson, TX (US); Lori L. Kardos, Freeport, TX (US); David T. Gillespie, Pearland, TX (US); John N. Naumovitz, Midland, MI (US); Chuan Yar Lai, Houston, TX (US); Zachary L. Polk, Addis, LA (US)

(73) Assignee: Dow Global Technologies LLC, Midland, MI (US)

( * ) Notice: Subject to any disclaimer, the term of this patent is extended or adjusted under 35 U.S.C. 154(b) by 116 days.

(21) Appl. No.: 16/488,861

(22) PCT Filed: Feb. 27, 2018

(86) PCT No.: PCT/US2018/019947
§ 371 (c)(1),
(2) Date: Aug. 26, 2019

(87) PCT Pub. No.: WO2018/160558
PCT Pub. Date: Sep. 7, 2018

(65) Prior Publication Data
US 2021/0108053 A1 Apr. 15, 2021

Related U.S. Application Data

(60) Provisional application No. 62/464,458, filed on Feb. 28, 2017.

(51) Int. Cl.
*C08L 23/06* (2006.01)
*B32B 27/32* (2006.01)
*C08J 5/18* (2006.01)

(52) U.S. Cl.
CPC ............. *C08L 23/06* (2013.01); *B32B 27/32* (2013.01); *C08J 5/18* (2013.01); *B32B 2307/40* (2013.01);
(Continued)

(58) Field of Classification Search
CPC ....... B32B 27/327; B32B 27/06; B32B 27/306; B32B 27/302; B32B 27/32; B32B 27/40;
(Continued)

(56) References Cited

U.S. PATENT DOCUMENTS 5,844,045 A 12/1998 Kolthammer et al.
5,869,575 A 2/1999 Kolthammer et al.
(Continued)

FOREIGN PATENT DOCUMENTS

CN 1934184 A 3/2007
CN 105593285 A 5/2016
(Continued)

OTHER PUBLICATIONS

Mourey et al., "A Strategy for Interpreting Multidetector Size-Exclusion Chromatohraphy Data. I. Development of a Systematic Approach", Chromatography Polym. Chpt 12, 1992.
(Continued)

*Primary Examiner* — William K Cheung
(74) *Attorney, Agent, or Firm* — Dinsmore & Shohl LLP

(57) ABSTRACT

A composition comprising an ethylene-based polymer which comprises the following properties: a) MWD(conv)
(Continued)

from 3.0 to 7.0; b) an ADF IR between 0.230 and 0.260 for molecular weight ≤15,000 g/mol c) I2 from 4.0 to 6.5 g/10 min.

10 Claims, 2 Drawing Sheets

(52) U.S. Cl.
CPC ..... *B32B 2307/72* (2013.01); *B32B 2323/046* (2013.01); *C08J 2323/06* (2013.01)

(58) Field of Classification Search
CPC ............ B32B 2270/00; B32B 2553/00; B32B 2439/70; B32B 2410/00; B32B 2555/02; B32B 227/00; C08F 210/02; C08F 2500/04; C08F 2500/08; C08F 2500/09; C08F 2500/11; C08F 2500/12; C08F 2500/17; C08F 2/02; C08F 4/34; C08F 2/38
USPC .......................................................... 428/519
See application file for complete search history.

(56) References Cited

U.S. PATENT DOCUMENTS

| | | | |
|---|---|---|---|
| 6,448,341 B1 | 9/2002 | Kolthammer et al. | |
| 6,538,070 B1 | 3/2003 | Cardwell et al. | |
| 6,545,088 B1 | 4/2003 | Kolthammer et al. | |
| 6,566,446 B1 | 5/2003 | Parikh et al. | |
| 8,415,442 B2 | 4/2013 | Karjala et al. | |
| 8,781,810 B2 | 7/2014 | Cancedda et al. | |
| 8,822,601 B2 | 9/2014 | Karjala et al. | |
| 8,871,887 B2 | 10/2014 | Karjala et al. | |
| 8,916,667 B2 | 12/2014 | Karjala et al. | |
| 9,068,032 B2 | 6/2015 | Karjala et al. | |
| 9,228,036 B2 | 1/2016 | Berbee et al. | |
| 9,243,087 B2 | 1/2016 | Karjala et al. | |
| 9,303,107 B2 | 4/2016 | Karjala et al. | |
| 9,752,021 B2 | 9/2017 | Demirors et al. | |
| 9,765,160 B2 | 9/2017 | Den Doelder et al. | |
| 9,809,701 B2 | 11/2017 | den Doelder et al. | |
| 9,828,496 B2 | 11/2017 | den Doelder et al. | |
| 10,301,403 B2 | 5/2019 | Berbee et al. | |
| 10,358,543 B2 | 7/2019 | den Doelder et al. | |
| 10,836,852 B2* | 11/2020 | Karjala | ............... C08J 5/18 |
| 2013/0266786 A1* | 10/2013 | Malakoff | ............... C08J 5/18 428/220 |
| 2014/0316094 A1 | 10/2014 | Berbee et al. | |
| 2016/0083568 A1 | 3/2016 | den Doelder et al. | |
| 2016/0137822 A1 | 5/2016 | den Doelder et al. | |

FOREIGN PATENT DOCUMENTS

| | | |
|---|---|---|
| WO | 2006049783 A1 | 5/2006 |
| WO | 2013151687 A1 | 10/2013 |
| WO | 2017146981 A1 | 8/2017 |
| WO | 2017201110 A1 | 11/2017 |

OTHER PUBLICATIONS

Balke et al., "A Strategy for Interrepting Multidetector Size-Exclusion Chromatography Data II Applications in Plastic Waste Recovery", Chromatography Polym. Chpt 13, 1992.
Yau, Wallace W., "Examples of Using 3D-GPC-TREF for Polyolefin Characterization", Macromol. Symp., 2007, 257, 29-45.
Williams et al., "The Construction of a Polyethylene Calibration Curve for Gel Permeation Chromatography using Polystyrene Fractions", J. Polym. Sci., Polym. Let., 1968, 6, 62.
Zimm, Bruno H., "Apparatus and Methods for Measurement and Interpretation of the Angular Variation of Light Scattering; Preliminary Results on Polystyrene Solutions", J.Chem. Phys., 1948, 16, 1099.
Kratochvil, P., "Fundamental Light-Scattering Methods", Classical Light Scattering from Polymer Solutions, Elsevier, Oxford, NY,1987.
International Search Report and Written Opinion pertaining to PCT/US2018/019947, dated May 11, 2018.
Chinese Examination Report pertaining to Chinese patent application No. 201880012057.X, dated Apr. 26, 2021, 1 page.
Search Report pertaining to Chinese patent application No. 201880012057.X, dated Apr. 26, 2021, 2 pages.

* cited by examiner

ETHYLENE-BASED POLYMERS WITH GOOD PROCESSABILITY FOR USE IN MULTILAYER FILMS

REFERENCE TO RELATED APPLICATIONS

This U.S. Application is a U.S. national stage application of International App. No. PCT/US2018/019947, filed on 27 Feb. 2018, which claims the benefit of priority to earlier filed U.S. Provisional Patent Application No. 62/464,458, filed on 28 Feb. 2017, each of which is hereby incorporated by reference in its entirety.

BACKGROUND

There is a need for a LDPE resin that has good processability, and which can be used in a multilayer film, in neat form, or as a layer in a blend with another polymer, preferably an olefin-based polymer. LDPE resins are described in the following patent references: U.S. Pat. Nos. 8,415,442, 9,243,087, 9,228,036 (see also U.S. Publication 2014/0316094, U.S. Pat. Nos. 8,822,601, 8,871,887, 8,916,667 (see also U.S. Pat. No. 9,303,107), U.S. Publication 2016/0137822, U.S. Publication 2016/0083568, WO2017/146981 and WO2017/201110). However, there remains a need for an LDPE resin that has good processability, and which can be used in single or multilayer cast films and sheets. There is a further need for such a resin that does not include a sulfur-containing compound. These needs have been met by the following invention.

SUMMARY OF THE INVENTION

A composition comprising an ethylene-based polymer which comprises the following properties:
a) a MWD(conv) from 3.0 to 7.0;
b) an ADF IR between 0.230 and 0.260 for molecular weight ≤15,000 g/mol; and
c) an I2 from 4.0 to 6.5 g/10 min.

DETAILED DESCRIPTION

Figure 1:
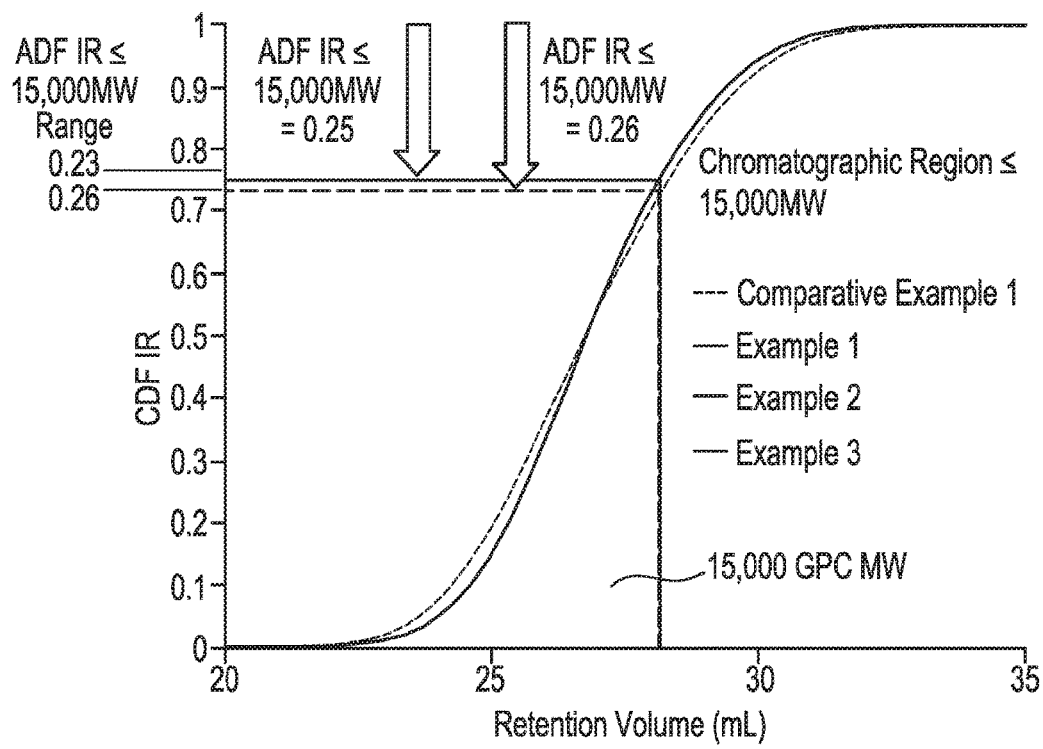
FIG. 1 is a CDF visualization of the (IR) fraction (ADF) at ≤15,000 g/mol GPC molecular weight of the polymer.

As discussed above, a composition is provided, said composition comprising an ethylene-based polymer which comprises the following properties:
a) A MWD(conv) from 3.0 to 7.0;
b) an ADF IR between 0.230 and 0.260 for molecular weight ≤15,000 g/mol; and
c) an I2 from 4.0 to 6.5 g/10 min.

A composition may comprise a combination of two or more embodiments described herein.

In one embodiment, the ethylene-based polymer further comprises an ADF LS from 0.420 to 0.480 for molecular weight ≥500,000 g/mol.

In one embodiment, the ethylene-based polymer comprises an ADF IR from 0.230 to 0.255, or from 0.235 to 0.255, or from 0.240 to 0.255 for molecular weight ≤15,000 g/mol.

In one embodiment, the ethylene-based polymer further comprises an ADF DV from 0.200 to 0.260 for molecular weight ≥200,000 g/mol.

In one embodiment, the ethylene-based polymer comprises an intrinsic viscosity from 0.80 dl/g to 0.85 dl/g.

In one embodiment, the ethylene-based polymer has a density from 0.910 to 0.925 g/cc, or from 0.912 to 0.924 g/cc, or from 0.914 to 0.923 g/cc, or from 0.916 to 0.922 g/cc, or from 0.918 to 0.922 g/cc, or from 0.918 to 0.921.

In one embodiment, the ethylene-based polymer has an ADF DV ≥0.180, or ≥0.190, for molecular weight ≥200,000 g/mol.

In one embodiment, the ethylene-based polymer has a tan delta (0.1 rad/sec, 190° C.) ≤15.0, or ≤14.0, or ≤13.0, or ≤12.0. In one embodiment, the ethylene-based polymer has a tan delta (0.1 rad/sec, 190° C.)≥4.0, or ≥4.5, or ≥5.0, or ≥5.5.

In one embodiment, the ethylene-based polymer has a viscosity (100 rad/sec, 190° C.) ≤400 Pa·s, or ≤380 Pa·s, or ≤370 Pa·s, or ≤360 Pa·s, or ≤350 Pa·s.

In one embodiment, the ethylene-based polymer has a viscosity (100 rad/sec, 190° C.)≥200 Pa·s, or ≥220 Pa·s, or ≥240 Pa·s, or ≥260 Pa·s, or ≥280 Pa·s, or ≥300 Pa·s.

In one embodiment, the ethylene-based polymer has a viscosity ratio (V0.1/V100, 190° C.) from 3 to 20, or from 5 to 15, or from 6 to 10, or from 7 to 7.7.

In one embodiment, the ethylene-based polymer has a peak melting temperature (Tm), from 100 to 120° C., or from 102 to 115° C., or 105 to 110° C., as determined by DSC. As used herein, the "peak melting temperature" is the melt temperature for the highest peak intensity, if there exists two or more peaks in the DSC profile.

In one embodiment, the ethylene-based polymer has a % crystallinity from 40 to 60%, or from 45 to 55%.

In one embodiment, the ethylene-based polymer has a Mw(abs)≤200,000 g/mol, ≤195,000 g/mol ≤190,000 g/mol, or ≤185,000 g/mol, or ≤180,000 g/mol.

In one embodiment, the ethylene-based polymer has a Mw(abs) ≥130,000 g/mol, ≥135,000 g/mol ≥140,000 g/mol, or ≥145,000 g/mol, or ≥150,000 g/mol.

In one embodiment, the ethylene-based polymer has a Mn(conv) from 5,000 to 30,000 g/mol, or from 8,000 to 25,000 g/mol, or from 10,000 to 20,000 g/mol.

In one embodiment, the ethylene-based polymer has a Mw(conv) from 50,000 to 100,000 g/mol, or from 60,000 to 95,000 g/mol, or from 65,000 to 90,000 g/mol, or from 70,000 to 85,000 g/mol.

In one embodiment, the ethylene-based polymer has an Mw(abs)/Mw(conv) from 2.10 to 2.30, or from 2.15 to 2.25.

In one embodiment, the ethylene-based polymer is an LDPE.

Also provided is an article comprising at least one component formed from a composition of anyone of the embodiments described herein.

Also provided is a multilayer film comprising at least one layer formed from a composition of anyone of the embodiments described herein.

Process

For producing an inventive ethylene-based polymer, a high pressure, free-radical initiated polymerization process is typically used. Two different high pressure free-radical initiated polymerization process types are known. In the first type, an agitated autoclave vessel having one or more reaction zones is used. The autoclave reactor normally has several injection points for initiator or monomer feeds, or both. In the second type, a jacketed tube is used as a reactor, which has one or more reaction zones. Suitable, but not limiting, reactor lengths may be from 100 to 3000 meters (m), or from 1000 to 2000 m. The beginning of a reaction zone for either type of reactor is typically defined by the side injection of either initiator for the reaction, ethylene, chain transfer agent (or telomer), comonomer(s), as well as any combination thereof. A high pressure process can be carried out in autoclave or tubular reactors having one or more reaction zones, or in a combination of autoclave and tubular reactors, each comprising one or more reaction zones.

A chain transfer agent (CTA) can be used to control molecular weight. In one embodiment, one or more chain transfer agents (CTAs) are added to an inventive polymerization process. Typical CTAs that can be used include, but are not limited to, propylene, isobutane, n-butane, 1-butene, methyl ethyl ketone, acetone, and propionaldehyde. In one embodiment, the amount of CTA used in the process is from 0.03 to 10 weight percent of the total reaction mixture.

Ethylene used for the production of the ethylene-based polymer may be purified ethylene, which is obtained by removing impurities from a loop recycle stream, or by using a reaction system configuration, such that only fresh ethylene is used for making the inventive polymer. It is not typical that only purified ethylene is required to make the ethylene-based polymer. In such cases, ethylene from the recycle loop may be used.

Additives

An inventive composition may comprise one or more additives. Additives include, but are not limited to, stabilizers, plasticizers, antistatic agents, pigments, dyes, nucleating agents, fillers, slip agents, fire retardants, processing aids, smoke inhibitors, viscosity control agents and anti-blocking agents. The polymer composition may, for example, comprise less than 10 percent (by the combined weight) of one or more additives, based on the weight of the inventive polymer composition.

In one embodiment, the polymers of this invention are treated with one or more stabilizers, for example, antioxidants, such as IRGANOX 1010, IRGANOX 1076 and IRGAFOS 168 (Ciba Specialty Chemicals; Glattbrugg, Switzerland). In general, the polymers are treated with one or more stabilizers before extrusion or other melt processes. Processing aids, such as plasticizers, include, but are not limited to, the phthalates, such as dioctyl phthalate and diisobutyl phthalate, natural oils such as lanolin, and paraffin, naphthenic and aromatic oils obtained from petroleum refining, and liquid resins from rosin or petroleum feedstocks. Exemplary classes of oils, useful as processing aids, include white mineral oil such as KAYDOL oil (Chemtura Corp.; Middlebury, Conn.) and SHELLFLEX 371 naphthenic oil (Shell Lubricants; Houston, Tex.). One other suitable oil is TUFFLO oil (Lyondell Lubricants; Houston, Ill.).

Blends and mixtures of the inventive polymer with other polymers may be performed. Suitable polymers for blending with the inventive polymer include natural and synthetic polymers. Exemplary polymers for blending include propylene-based polymers (for example, impact modifying polypropylene, isotactic polypropylene, atactic polypropylene, and random ethylene/propylene copolymers), various types of ethylene-based polymers, including high pressure, free-radical LDPE, LLDPE prepared with Ziegler-Natta catalysts, PE (polyethylene) prepared with single site catalysts, including multiple reactor PE ("in reactor" blends of Ziegler-Natta PE and single site catalyzed PE, such as products disclosed in U.S. Pat. Nos. 6,545,088 (Kolthammer et al.); 6,538,070 (Cardwell, et al.); 6,566,446 (Parikh, et al.); 5,844,045 (Kolthammer et al.); 5,869,575 (Kolthammer et al.); and 6,448,341 (Kolthammer et al.)), EVA, ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Homogeneous polymers, such as olefin plastomers and elastomers, ethylene and propylene-based copolymers (for example, polymers available under the trade designation VERSIFY Plastomers & Elastomers (The Dow Chemical Company) and VISTAMAXX (ExxonMobil Chemical Co.) can also be useful as components in blends comprising the inventive polymer).

Applications

The polymers of this invention may be employed in a variety of conventional thermoplastic fabrication processes to produce useful articles, including, but not limited to, monolayer films and sheets, multilayer films and sheets; molded articles, such as blow molded, injection molded, thermoformed, or rotomolded articles; coatings; fibers; and woven or non-woven fabrics; blown and cast films.

An inventive polymer may be used in a variety of films, including but not limited to, extrusion coating, food packaging, consumer, industrial, agricultural (applications or films), lamination films, fresh cut produce films, meat films, cheese films, candy films, clarity shrink films, collation shrink films, stretch films, silage films, greenhouse films, fumigation films, liner films, stretch hood, heavy duty shipping sacks, pet food, sandwich bags, sealants, and diaper backsheets.

An inventive polymer is also useful in other direct end-use applications. An inventive polymer may be used for wire and cable coating operations, in sheet extrusion for vacuum forming operations, and forming molded articles, including the use of injection molding, blow molding, or rotomolding processes.

Other suitable applications for the inventive polymers include elastic films and fibers; soft touch goods, such as appliance handles; gaskets and profiles; auto interior parts and profiles; foam goods (both open and closed cell); impact modifiers for other thermoplastic polymers, such as high density polyethylene, or other olefin polymers; cap liners; and flooring.

A) As discussed, composition is provided comprising an ethylene-based polymer which comprises the following properties:
  a) MWD(conv) from 3.0 to 7.0;
  b) an ADF IR from 0.230 to 0.260 for molecular weight ≤15,000 g/mol;
  c) I2 from 4.0 to 6.5 g/10 min.
B) The composition of A) above, wherein the ethylene-based polymer further comprises
  d) an ADF LS from 0.420 to 0.480 for molecular weight ≥500,000 g/mol.
C) The composition of any one of A) or B) above, wherein the ethylene-based polymer further comprises an ADF DV from 0.200 to 0.260 for molecular weight ≥200,000 g/mol.
D) The composition of any one of A)-C) above, wherein the ethylene-based polymer further comprises an intrinsic viscosity from 0.80 dl/g to 0.85 dl/g.
E) The composition of any one of A)-D) above, wherein the ethylene-based polymer further comprises an absolute Mw(abs) from 145,000 g/mol to 180,000 g/mol.

F) The composition of any one of A)-E) above, wherein the ethylene-based polymer has a density from 0.910 to 0.925 g/cc.

G) The composition of any one of A)-F), wherein ethylene-based polymer comprises an ADF DV ≥0.18, for molecular weight ≥200,000 g/mole.

H) The composition of anyone of A)-G), wherein ethylene-based polymer has a tan delta (0.1 rad/sec, 190° C.) ≤15.0.

I) The composition of anyone of A)-H), wherein ethylene-based polymer has a tan delta (0.1 rad/sec, 190° C.)≥4.0.

J) The composition of anyone of A)-I), wherein ethylene-based polymer has a viscosity (100 rad/sec, 190° C.) ≤400 Pa·s.

K) The composition of anyone of A)-J), wherein ethylene-based polymer has a viscosity (100 rad/sec, 190° C.)≥200 Pa·s.

L) The composition of anyone of A)-K), wherein ethylene-based polymer has a viscosity ratio (V0.1N100, 190° C.) from 3 to 20.

M) The composition of anyone of A)-L), wherein ethylene-based polymer has a peak melting temperature (Tm) from 100 to 120° C.

N) The composition of anyone of A)-M), wherein ethylene-based polymer has a % crystallinity from 40 to 60%.

O) The composition of anyone of A)-N), wherein ethylene-based polymer has a Mw(abs)≤200,000 g/mole.

P) The composition of anyone of A)-O), wherein ethylene-based polymer has a Mn(conv) from 5,000 to 30,000 g/mole.

Q) The composition of anyone of A)-P), wherein ethylene-based polymer has a Mw(conv) from 50,000 to 100,000 g/mole.

R) The composition of anyone of A)-Q), wherein ethylene-based polymer has a Mw(abs)/Mw(conv) from 2.10 to 2.30.

S) The composition of anyone of A)-R), wherein ethylene-based polymer is a LDPE.

T) An article comprising at least one component formed from the composition of anyone of A)-S) above.

U) A multilayer film comprising at least one layer formed from the composition of anyone of A)-S) above.

Definitions

The phrase "high pressure, free-radical polymerization process," as used herein, refers to a free radical initiated polymerization carried out at an elevated pressure of at least 1000 bar (100 MPa).

The term "polymer," as used herein, refers to a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities (for example, catalyst residues) may be incorporated into and/or within the polymer.

The term "interpolymer," as used herein, refers to polymers prepared by the polymerization of at least two different types of monomers. The generic term interpolymer includes copolymers (employed to refer to polymers prepared from two different types of monomers), and polymers prepared from more than two different types of monomers.

The term "ethylene-based polymer," as used herein, refers to a polymer that comprises a majority amount of polymerized ethylene monomer (based on weight of the polymer) and, optionally, may contain at least one comonomer.

The term "ethylene/α-olefin interpolymer," as used herein, refers to an interpolymer that comprises a majority amount of polymerized ethylene monomer (based on the weight of the interpolymer) and at least one α-olefin.

The term, "ethylene/α-olefin copolymer," as used herein, refers to a copolymer that comprises a majority amount of polymerized ethylene monomer (based on the weight of the copolymer), and an α-olefin, as the only two monomer types.

The term "propylene-based polymer," as used herein, refers to a polymer that comprises a majority amount of polymerized propylene monomer (based on weight of the polymer) and, optionally, may comprise at least one comonomer.

The term "composition," as used herein, includes a mixture of materials which comprise the composition, as well as reaction products and decomposition products formed from the materials of the composition.

The terms "blend" or "polymer blend," as used, refers to a mixture of two or more polymers. A blend may or may not be miscible (not phase separated at the molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding) or the micro level (for example, simultaneous forming within the same reactor).

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of excludes any component, step or procedure not specifically delineated or listed.

Test Methods

Density

Samples for density measurements were prepared according to ASTM D 4703-10 Annex A1 Procedure C. Approximately 7 g of sample was placed in a "2"×2"×135 mil thick" mold, and this was pressed at 374° F. (190° C.) for six minutes at 3,000 lb$_f$ (0.0133 MN). Then the pressure was increased to 30,000 lb$_f$ (0.133 MN) for four minutes. This was followed by cooling at 15° C. per minute, at 30,000 lb$_f$ (0.133 MN), to approximately a temperature of 40° C. The "2"×2"×135 mil" polymer sample (plaque) was then removed from the mold, and three samples were cut from the plaque with a ½"×1" die cutter. Density measurements were made within one hour of sample pressing, using ASTM D792-08, Method B. Density was reported as an average of three measurements.

Melt Index

Melt index (MI), or I2, was measured in accordance with ASTM D 1238-10, Condition 190° C./2.16 kg, Procedure B, and was reported in grams eluted per 10 minutes (g/10 min).

Hexane Extractables

Polymer pellets (from the polymerization pelletization process, without further modification; approximately 2.2 grams per one "1-inch by 1-inch" square film) were pressed in a Carver Press at a thickness of 3.0-4.0 mils. The pellets were pressed at 190° C. for 3 minutes, at 40,000 lb$_f$ (0.178 MN). Non-residue gloves (PIP*CleanTeam*CottonLisle Inspection Gloves, Part Number: 97-501) were worn to prevent contamination of the film with residual oils from the hands of the operator. Each film was trimmed to a "1-inch by 1-inch" square, and weighed (2.5±0.05 g). The films were extracted for two hours, in a hexane vessel, containing about 1000 ml of hexane, at 49.5±0.5° C., in a heated water bath. The hexane was an isomeric "hexanes" mixture (for example, Hexanes (Optima), Fisher Chemical, high purity mobile phase for HPLC and/or extraction solvent for GC applications). After two hours, the films were removed, rinsed in clean hexane, and dried in a vacuum oven (80±5° C.) at full vacuum (ISOTEMP Vacuum Oven, Model 281A, at approximately 30 inches Hg) for two hours. The films were then placed in a desiccator, and allowed to cool to room temperature for a minimum of one hour. The films were then reweighed, and the amount of mass loss due to extraction in hexane was calculated. This method is based on 21 CRF 177.1520 (d)(3)(ii), with one deviation from FDA protocol by using hexanes instead of n-hexane. The average of three measurements was reported.

Nuclear Magnetic Resonance ($^{13}$C NMR)

Each sample was prepared by adding approximately "3 g of a 50/50 mixture of tetrachloroethane-d2/orthodichlorobenzene, containing 0.025 M Cr(AcAc)$_3$," to a "0.25 to 0.40 g polymer sample," in a 10 mm NMR tube. The sample was then dissolved and homogenized by heating the tube, and its contents to 150° C., using a heating block and heat gun. Each dissolved sample was visually inspected to ensure homogeneity. All data were collected using a Bruker 400 MHz spectrometer, equipped with a Bruker Dual DUL high-temperature CryoProbe. The data was acquired using a six second pulse repetition delay, 90-degree flip angles, and inverse gated decoupling, with a sample temperature of 120° C. All measurements were made on non-spinning samples in locked mode. The $^{13}$C NMR chemical shifts were internally referenced to the EEE triad at 30.0 ppm. The C6+ value was a direct measure of C6+ branches in LDPE, where the long branches were not distinguished from chain ends. The 32.2 ppm peak, representing the third carbon from the end of all chains or branches of six or more carbons, was used to determine the C6+ value. Other peaks of interest are listed in Table A.

TABLE A $^{13}$C NMR Peaks of Sample Polymers

| Branch Type | Peak(s) integrated | Identity of the integrated carbon peak(s) |
| --- | --- | --- |
| 1,3 diethyl | About 10.5 to 11.5 ppm | 1,3 diethyl branch methyls |
| C1 | About 19.75 to 20.50 ppm | C1, methyls |
| C2 on Quat Carbon | About 7.7 to 8.6 ppm | 2 ethyl groups on a quaternary carbon |
| C4 | About 23.3 to 23.5 ppm | Second CH$_2$ in a 4-carbon branch, counting the methyl as the first C |
| C5 | About 32.60 to 32.80 ppm | Third CH$_2$ in a 5-carbon branch, counting the methyl as the first C |

Nuclear Magnetic Resonance ($^1$H NMR)

Each sample was prepared by adding approximately 130 mg of sample to "3.25 g of 50/50, by weight, tetrachlorethane-d2/perchloroethylene" with 0.001 M Cr(AcAc)$_3$, in a NORELL 1001-7, 10 mm NMR tube. The sample was purged by bubbling N2 through the solvent, via a pipette inserted into the tube, for approximately five minutes, to prevent oxidation. The tube was capped, sealed with TEFLON tape, and then soaked at room temperature, overnight, to facilitate sample dissolution. The sample was heated and vortexed at 115° C. to ensure homogeneity.

The $^1$H NMR was performed on a Bruker AVANCE 400 MHz spectrometer, equipped with a Bruker Dual DUL high-temperature CryoProbe, and at a sample temperature of 120° C. Two experiments were run to obtain spectra, a control spectrum to quantitate the total polymer protons, and a double presaturation experiment, which suppressed the intense polymer backbone peaks, and enabled high sensitivity spectra for quantitation of the end-groups. The control was run with ZG pulse, 16 scans, AQ 1.64s, D1 14s. The double presaturation experiment was run with a modified pulse sequence, 100 scans, AQ 1.64s, presaturation delay 1s, relaxation delay 13s.

The signal from residual $^1$H in TCE-d2 (at 6.0 ppm) was integrated, and set to a value of 100, and the integral from 3 to −0.5 ppm was used as the signal from the whole polymer in the control experiment. For the presaturation experiment, the TCE signal was also set to 100, and the corresponding integrals for unsaturation (vinylene (cis and trans) at about 5.40 to 5.60 ppm, trisubstituted at about 5.16 to 5.35 ppm, vinyl at about 4.95 to 5.15 ppm, and vinylidene at about 4.70 to 4.90 ppm) were obtained.

Melt Strength

Melt strength measurements were conducted on a Gottfert Rheotens 71.97 (Goettfert Inc.; Rock Hill, S.C.), attached to a Gottfert Rheotester 2000 capillary rheometer. The melted sample (about 25 to 30 grams) was fed with a Goettfert Rheotester 2000 capillary rheometer, equipped with a flat entrance angle (180 degrees) of length of 30 mm, diameter of 2.0 mm, and an aspect ratio (length/diameter) of 15. After equilibrating the samples at 190° C. for 10 minutes, the piston was run at a constant piston speed of 0.265 mm/second. The standard test temperature was 190° C. The sample was drawn uniaxially to a set of accelerating nips, located 100 mm below the die, with an acceleration of 2.4 mm/s$^2$. The tensile force was recorded as a function of the take-up speed of the nip rolls. The following conditions were used in the melt strength measurements: plunger speed=0.265 mm/second; wheel acceleration=2.4 mm/s$^2$; capillary diameter=2.0 mm; capillary length=30 mm; and barrel diameter=12 mm. Melt strength is reported as the plateau force (cN) before the strand broke.

Dynamic Mechanical Spectroscopy (DMS)

Resins were compression-molded into "3 mm thick×1 inch" circular plaques at 350° F., for 6.5 minutes, under 20,000 lb$_f$ (0.0890 MN) in air. The sample was then taken out of the press, and placed on the counter to cool.

A constant temperature frequency sweep was performed, using a TA Instruments "Advanced Rheometric Expansion System (ARES)," equipped with 25 mm (diameter) parallel plates, under a nitrogen purge. The sample was placed on the plate, and allowed to melt for five minutes at 190° C. The plates were then closed to a gap of 2 mm, the sample trimmed (extra sample that extends beyond the circumference of the "25 mm diameter" plate was removed), and then the test was started. The method had an additional five minute delay built in, to allow for temperature equilibrium. The experiments were performed at 190° C., over a frequency range of 0.1 to 100 rad/s. The strain amplitude was constant at 10%. The complex viscosity η*, tan (δ) or tan delta, viscosity at 0.1 rad/s (V0.1), the viscosity at 100 rad/s (V100), and the viscosity ratio (V0.1/V100) were measured.

Triple Detector Gel Permeation Chromatography (TDGPC)

The chromatographic system consisted of a PolymerChar GPC-IR (Valencia, Spain) high temperature GPC chromatograph, equipped with an internal IR5 infra-red detector (IR5) coupled to a Precision Detectors (Now Agilent Technologies) 2-angle laser light scattering (LS) detector Model 2040, and followed by a PolymerChar 4-capillary viscosity detector (three detectors in series). For all light scattering measurements, the 15 degree angle was used for measurement purposes. The autosampler oven compartment was set at 160° Celsius, and the column compartment was set at 150° Celsius. The columns used were four, Agilent "Mixed A" columns, each 30 cm, and each packed with 20-micron linear mixed-bed particles. The chromatographic solvent used was 1,2,4-trichlorobenzene, which contained 200 ppm of butylated hydroxytoluene (BHT). The solvent source was nitrogen sparged. The injection volume was 200 microliters, and the flow rate was 1.0 milliliters/minute.

Calibration of the GPC column set was performed with at least 20 narrow molecular weight distribution, polystyrene standards with molecular weights ranging from 580 to 8,400,000 g/mol. These standards were arranged in 6 "cocktail" mixtures, with approximately a decade of separation between individual molecular weights. The standards were purchased from Agilent Technologies. The polystyrene standards were prepared at "0.025 grams in 50 milliliters of solvent" for molecular weights equal to, or greater than, 1,000,000, g/mol, and at "0.05 grams in 50 milliliters of solvent" for molecular weights less than 1,000,000 g/mol. The polystyrene standards were dissolved at 80° C., with gentle agitation, for 30 minutes. The polystyrene standard peak molecular weights (IR 5 detector) were converted to polyethylene molecular weights using Equation 1 (as described in Williams and Ward, J. Polym. Sci., Polym. Let., 6, 621 (1968)):

$$M_{polyethylene} = A \times (M_{polystyrene})^B \quad \text{(EQN 1)},$$

where M is the molecular weight, A has a value of 0.4315, and B is equal to 1.0.

A fifth order polynomial was used to fit the respective polyethylene-equivalent calibration points. A small adjustment to A (from approximately 0.415 to 0.44) was made to correct for column resolution and band-broadening effects, such that NIST standard NBS 1475 was obtained at 52,000 g/mol (Mw).

The total plate count of the GPC column set was performed with EICOSANE (prepared at 0.04 g in 50 milliliters of TCB (1,2,4-trichlorobenzene) stabilized solvent, and dissolved for 20 minutes with gentle agitation.) The plate count (Equation 2) and symmetry (Equation 3) were measured on a 200 microliter injection according to the following equations:

$$\text{Plate Count} = 5.54 * \left( \frac{(RV_{Peak\,Max})}{\text{Peak Width at } \frac{1}{2} \text{ height}} \right)^2 \quad \text{(EQN 2)}$$

where RV is the retention volume in milliliters, the peak width is in milliliters, the peak max is the maximum height of the peak, and ½ height is the ½ height of the peak maximum:

$$\text{Symmetry} = \frac{(\text{Rear Peak } RV_{one\,tenth\,height} - RV_{Peak\,max})}{RV_{Peak\,max} - \text{Front Peak } RV_{one\,tenth\,height}}, \quad \text{(EQN 3)}$$

where RV is the retention volume in milliliters, and the peak width is in milliliters, "Peak max" is the maximum IR signal height corresponding to an "RV position" on the chromatogram, "One tenth height" 1/10 height of the peak maximum, where "Rear peak" refers to the peak tail at a signal retention volume (at 1/10 height of peak maximum), later than the peak max, and where "Front peak" refers to the peak front at a signal retention volume (at 1/10 height of peak maximum), earlier than the peak max. The plate count for the chromatographic system should be greater than 24,000, and the symmetry should be between 0.98 and 1.22.

Samples were prepared in a semi-automatic manner with the PolymerChar "Instrument Control" Software, wherein the samples were weight-targeted at 2 mg/ml, and the solvent (contained 200 ppm BHT) was added to a pre nitrogen-sparged septa-capped vial, via the PolymerChar high temperature autosampler. Decane (a flow rate marker) was added to each sample (about 5 microliters). The samples were dissolved for two hours at 160° Celsius, under a "low speed" shaking.

IR 5 Chromatogram

The calculations of Mn(conv), Mw(conv), and Mz(conv) were based on the GPC results, using the internal IR5 detector (measurement channel) of the PolymerChar GPC-IR chromatograph, according to Equations 4-6, using PolymerChar GPCOne™ software (version 2013G), the baseline-subtracted IR chromatogram at each equally-spaced data collection point (i), and the polyethylene equivalent molecular weight obtained from the narrow standard calibration curve for the point (i) from Equation 1. Table 4 lists the conventional GPC results for the examples and comparative examples using Equations 4-6, below for the conventional GPC.

$$Mn_{(conv)} = \frac{\sum_i IR_i}{\sum_i (IR_i / M_{polyethylene_i})}, \quad \text{(EQN 4)}$$

$$Mw_{(conv)} = \frac{\sum_i (IR_i * M_{polyethylene_i})}{\sum_i IR_i}, \quad \text{(EQN 5)}$$

$$Mz_{(conv)} = \frac{\sum_i (IR_i * M_{polyethylene_i}^2)}{\sum_i (IR_i * M_{polyethylene_i})}. \quad \text{(EQN 6)}$$

In order to monitor the deviations over time, a flowrate marker (decane) was introduced into each sample via a micropump controlled with the PolymerChar GPC-IR system. This flowrate marker (FM, here decane) was used to linearly correct the pump flowrate (Flowrate(nominal)) for each sample, by aligning the RV value of the respective decane peak within the sample (RV(FM Sample)), to that of the decane peak within the narrow standards calibration (RV(FM Calibrated)). Any changes in the time of the decane marker peak were then assumed to be related to a linear-shift in flowrate (Flowrate(effective)) for the entire run. To facilitate the highest accuracy of a RV measurement of the flow marker peak, a least-squares fitting routine was used to fit the peak of the flow marker concentration chromatogram to a quadratic equation. The first derivative of the quadratic equation was then used to solve for the true peak position. After calibrating the system based on a flow marker peak, the effective flowrate (with respect to the narrow standards calibration) was calculated using Equation 7. Processing of the flow marker peak was done via the PolymerChar GPCOne™ Software. Acceptable flowrate correction was such that the effective flowrate should be within +/−2% of the nominal flowrate.

Flowrate(effective)=Flowrate(nominal)*(RV(FM Calibrated)/RV(FM Sample)) (EQN 7)

The Systematic Approach for the determination of multi-detector offsets was done in a manner consistent with that published by Balke, Mourey, et al. (Mourey and Balke, Chromatography Polym. Chpt 12, (1992)) (Balke, Thitiratsakul, Lew, Cheung, Mourey, Chromatography Polym. Chpt 13, (1992)). Alignment of the triple detector log (MW and IV) results (generated from a broad homopolymer polyethylene standard (Mw/Mn=3)), to the narrow standard column calibration results (generated from the narrow standards calibration curve), was done using the PolymerChar GPCOne™ Software.

Light Scattering Chromatogram

The absolute molecular weight data (MWabs) was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)), using the PolymerChar GPCOne™ software. The overall injected concentration, used in the determination of the molecular weight, was obtained from the mass detector area and the mass detector constant, derived from a suitable linear polyethylene homopolymer, or one of the polyethylene standards of known weight-average molecular weight (traceable to NBS 1475 homopolymer polyethylene reference sample). The calculated molecular weights (using GPCOne™) were obtained using a light scattering constant, derived from one or more of the polyethylene standards mentioned below, and a refractive index concentration coefficient, dn/dc, of 0.104. Generally, the mass detector response (IR5) and the light scattering constant (determined using GPCOne™) should be determined from a linear standard with a molecular weight in excess of about 50,000 g/mol.

The Equation for Mw(abs) is an area-based result, using the baseline-subtracted 15 degree light scattering signal and the baseline-subtracted IR5 measurement sensor signal (applying the mass and light scattering constants), as determined from GPCOne™ software, $$Mw_{(abs)} = \frac{\sum_i LS_i}{\sum IR_i} \times \text{Mass Constant}/LS \text{ constant.} \quad \text{(EQN 8A)}$$

The equation for Mz(abs) relied on a point-by point determination of the absolute molecular weight derived from the ratio of the baseline-subtracted, 15 degree light scattering signal and the baseline-subtracted, IR5 measurement sensor signal, and factored for the mass constant and light scattering constant, using GPCOne™ software. A straight-line fit was used to extrapolate the absolute molecular weight, where either detector (IR5 or LS) is below approximately 4% relative peak signal height (maximum peak height).

$$Mz(\text{abs}) = \frac{\sum_i (IR_i * M_{Abs_i}^2)}{\sum_i (IR_i * M_{Abs_i})} \quad \text{(EQN 8B)}$$

Viscosity Chromatogram

The absolute intrinsic viscosity data (IV(abs)) was obtained using the area of the specific viscosity chromatogram, obtained from the PolymerChar viscometer detector, when calibrated to the known intrinsic viscosity of NBS 1475. The overall injected concentration used in the determination of the intrinsic viscosity was obtained from the mass detector area and the mass detector constant, derived from a suitable linear polyethylene homopolymer, or one of the polyethylene standards of known intrinsic viscosity (traceable to NBS 1475 homopolymer polyethylene reference sample).

The equation for IV(abs) is an area-based result using the baseline-subtracted specific-viscosity signal (DV) and the baseline-subtracted IR5 measurement sensor signal (applying the mass and viscosity constants), as determined from GPCOne™ software:

$$IV_{(Abs)} = \frac{\sum_i DV_i}{\sum_i IR_i} \times (\text{Mass Constant}/\text{Viscosity constant}). \quad \text{(EQN 8C)}$$

gpcBR Branching Index by Triple Detector GPC (TDGPC)

The gpcBR branching index was determined by first calibrating the light scattering, viscosity, and concentration detectors as described previously. Baselines were then subtracted from the light scattering, viscometer, and concentration chromatograms. Integration windows were then set, to ensure integration of all of the low molecular weight retention volume range in the light scattering and viscometer chromatograms that indicate the presence of detectable polymer from the infrared (IR5) chromatogram. Linear polyethylene standards were then used to establish polyethylene and polystyrene Mark-Houwink constants. Upon obtaining the constants, the two values were used to construct two linear reference conventional calibrations for polyethylene molecular weight and polyethylene intrinsic viscosity as a function of elution volume, as shown in Equations (9) and (10):

$$M_{PE} = \left(\frac{K_{PS}}{K_{PE}}\right)^{1/\alpha_{PE}+1} \cdot M_{PS}^{\alpha_{PS}+1/\alpha_{PE}+1}, \quad \text{(EQN 9)}$$

$$[\eta]_{PE} = K_{PS} \cdot M_{PS}^{\alpha+1}/M_{PE}. \quad \text{(EQN 10)}$$

The gpcBR branching index is a robust method for the characterization of long chain branching as described in Yau, Wallace W., "Examples of Using 3D-GPC—TREF for Polyolefin Characterization," Macromol. Symp., 2007, 257, 29-45. The index avoids the "slice-by-slice" TDGPC calculations traditionally used in the determination of g' values and branching frequency calculations, in favor of whole polymer detector areas. From TDGPC data, one can obtain the sample bulk absolute weight average molecular weight (Mw, Abs) by the light scattering (LS) detector, using the peak area method. The method avoids the "slice-by-slice" ratio of light scattering detector signal over the concentration detector signal, as required in a traditional g' determination.

With TDGPC, sample intrinsic viscosities were also obtained independently using Equations (11). The area calculation in this case offers more precision, because, as an overall sample area, it is much less sensitive to variation caused by detector noise and TDGPC settings on baseline and integration limits. More importantly, the peak area calculation was not affected by the detector volume offsets. Similarly, the high-precision, sample intrinsic viscosity (IV) was obtained by the area method shown in Equation (11):

$$IV = [\eta] = \sum_i w_i IV_i =$$

$$\sum_i \left(\frac{C_i}{\sum_i C_i}\right) IV_i = \frac{\sum_i C_i IV_i}{\sum_i C_i} = \frac{\sum_i DP_i}{\sum_i C_i} = \frac{DP \text{ Area}}{\text{Conc. Area}},$$

(EQN 11)

where $DP_i$ stands for the differential pressure signal monitored directly from the online viscometer.

To determine the gpcBR branching index, the light scattering elution area for the sample polymer was used to determine the molecular weight of the sample. The viscosity detector elution area for the sample polymer was used to determine the intrinsic viscosity (IV or $[\eta]$) of the sample.

Initially, the molecular weight and intrinsic viscosity for a linear polyethylene standard sample, such as SRM1475a or an equivalent, were determined using the conventional calibrations ("cc") for both molecular weight and intrinsic viscosity as a function of elution volume:

$$[\eta]_{cc} = \sum_i \left(\frac{C_i}{\sum_i C_i}\right) IV_i = \sum_i w_i IV_{cc,i}.$$

(EQN 12)

Equation (13) was used to determine the gpcBR branching index:

$$gpcBR = \left[\left(\frac{[\eta]_{CC}}{[\eta]}\right) \cdot \left(\frac{M_W}{M_{W,CC}}\right)^{\alpha_{PE}} - 1\right],$$

(EQN 13)

wherein $[\eta]$ is the measured intrinsic viscosity, $[\eta]_{cc}$ is the intrinsic viscosity from the conventional calibration (or conv GPC), Mw is the measured weight average molecular weight, and $M_{w,cc}$ is the weight average molecular weight of the conventional calibration. The weight average molecular weight by light scattering (LS) is commonly referred to as "absolute weight average molecular weight" or "Mw(abs)." The $M_{w,cc}$ from using conventional GPC molecular weight calibration curve ("conventional calibration") is often referred to as "polymer chain backbone molecular weight," "conventional weight average molecular weight" and "Mw(conv)."

All statistical values with the "cc or conv" subscript are determined using their respective elution volumes, the corresponding conventional calibration as previously described, and the concentration (Ci). The non-subscripted values are measured values based on the mass detector, LALLS, and viscometer areas. The value of $K_{PE}$ is adjusted iteratively, until the linear reference sample has a gpcBR measured value of zero. For example, the final values for a and Log K for the determination of gpcBR in this particular case are 0.725 and −3.355, respectively, for polyethylene, and 0.722 and −3.993, respectively, for polystyrene.

Once the K and a values have been determined using the procedure discussed previously, the procedure was repeated using the branched samples. The branched samples were analyzed using the final Mark-Houwink constants as the best "cc" calibration values.

The interpretation of gpcBR is straight forward. For linear polymers, gpcBR will be close to zero, since the values measured by LS and viscometry will be close to the conventional calibration standard. For branched polymers, gpcBR will be higher than zero, especially with high levels of long chain branching, because the measured polymer molecular weight will be higher than the calculated and the calculated $IV_{cc}$ will be higher than the measured polymer IV. In fact, the gpcBR value represents the fractional IV change due to the molecular size contraction effect as a result of polymer branching. A gpcBR value of 0.5 or 2.0 would mean a molecular size contraction effect of IV at the level of 50% and 200%, respectively, versus a linear polymer molecule of equivalent weight.

For these particular examples, the advantage of using gpcBR, in comparison to a traditional "g' index" and branching frequency calculations, is due to the higher precision of gpcBR. All of the parameters used in the gpcBR index determination are obtained with good precision, and are not detrimentally affected by the low TDGPC detector response at high molecular weight from the concentration detector. Errors in detector volume alignment also do not affect the precision of the gpcBR index determination.

Calculation of LCB frequency

The $LCB_f$ was calculated for each polymer sample by the following procedure:

1) The light scattering, viscosity, and concentration detectors were calibrated with NBS 1475 homopolymer polyethylene (or equivalent reference).
2) The light scattering and viscometer detector offsets were corrected relative to the concentration detector as described above in the calibration section (see references to Mourey and Balke).
3) Baselines were subtracted from the light scattering, viscometer, and concentration chromatograms and set integration windows making certain to integrate all of the low molecular weight retention volume range in the light scattering chromatogram that is observable from the refractometer chromatogram.
4) A linear homopolymer polyethylene Mark-Houwink reference line was established by injecting a standard with a polydispersity of at least 3.0, calculate the data file (from above calibration method), and record the intrinsic viscosity and molecular weight from the mass constant corrected data for each chromatographic slice.
5) The LDPE sample of interest was analyzed, the data file (from above calibration method) was calculated, and the intrinsic viscosity and molecular weight from the mass constant, corrected data for each chromatographic slice, were recorded. At lower molecular weights, the intrinsic viscosity and the molecular weight data may need to be extrapolated such that the measured molecular weight and intrinsic viscosity asymptotically approach a linear homopolymer GPC calibration curve.

6) The homopolymer linear reference intrinsic viscosity was shifted at each point (i) by the following factor: IVi=IVi*0.964 where IV is the intrinsic viscosity.
7) The homopolymer linear reference molecular weight was shifted by the following factor: M=M*1.037 where M is the molecular weight.
8) The g' at each chromatographic slice was calculated according to the following equation:

g'=(IV(LDPE)/IV(linear reference)), at the same M.

The IV(linear reference) was calculated from a fifth-order polynomial fit of the reference Mark-Houwink Plot and where IV(linear reference) is the intrinsic viscosity of the linear homopolymer polyethylene reference (adding an amount of SCB (short chain branching) to account for backbiting through 6) and 7) at the same molecular weight (M)). The IV ratio is assumed to be one at molecular weights less than 3,500 g/mol to account for natural scatter in the light scattering data.
9) The number of branches at each data slice was calculated according to the following equation:

$$\left[\frac{IV_{LDPE}}{IV_{linear\_reference}}\right]_M^{1.33} = \left[\left(1+\frac{B_n}{7}\right)^{1/2} + \frac{4}{9}\frac{B_n}{\pi}\right]^{-1/2}$$

10) The average LCB quantity was calculated across all of the slices (i), according to the following equation (here $LCB_{1000\ C} = LCB_f$):

$$LCB_{1000C} = \frac{\sum_{M=3500}^{i}\left(\frac{B_{n_i}}{14000}c_i\right)}{\sum c_i}$$

Molecular Architecture Determination

In order to determine the molecular architecture of various polymer compositions, the following procedure was used.

The chromatographic system consisted of a PolymerChar GPC-IR high temperature chromatograph equipped with a 4-capillary viscometer and an Agilent Technologies 2-angle laser light scattering detector Model 2040. The 15-degree angle of the light scattering detector was used for calculation purposes and the IR5 "measurement channel" was used as a measure of concentration. Data was collected and processed using PolymerChar GPC One® software. The system was equipped with an on-line solvent degas device.

The column compartment was operated at 160° C. The columns used were 4 Agilent "Mixed A" 30 cm 20-micron analytical columns. The solvent used was 1,2,4-trichlorobenzene. The samples were prepared at a concentration of 0.1 grams of polymer in 50 milliliters of solvent. The chromatographic solvent and the sample preparation solvent contained 200 ppm of butylated hydroxytoluene (BHT). Both solvent sources were nitrogen sparged. Polyethylene samples were shaken gently (speed of 1) at 160 degrees Celsius for 3 hours. The injection volume used was 200 microliters and the flow rate was 1.0 milliliters/minute.

Calibration of the GPC column set was performed with at least 20 narrow molecular weight distribution polystyrene standards with molecular weights ranging from 580 to 8,400,000 and were arranged in 6 "cocktail" mixtures with approximately a decade of separation between individual molecular weights. The standards were purchased from Agilent Technologies. The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were pre-dissolved at 80 degrees Celsius with gentle agitation for 30 minutes. The polystyrene standard peak molecular weights were converted to polyethylene molecular weights using the following equation (as described in Williams and Ward, J. Polym. Sci., Polym. Let., 6, 621 (1968)).

Mpolyethylene=A×(Mpolystyrene)B, where M is the molecular weight, A has a value of 0.41 and B is equal to 1.0. A fifth order polynomial was used to fit the respective polyethylene-equivalent GPC Log(molecular weight) calibration points.

The total plate count of the GPC column set was performed with decane (prepared at 0.04 g in 50 milliliters of TCB and dissolved for 20 minutes with gentle agitation.) The plate count and symmetry were measured on a 200 microliter injection according to the following equations:

$$\text{Plate Count} = 5.545\left(\frac{RV_{Peak\ Maximum}}{\text{Front }RV_{\frac{1}{2}Peak\ Maximum} - \text{Rear }Rv_{\frac{1}{2}Peak\ maximum}}\right)^2,$$

where RV is the retention volume in milliliters.

$$\text{Symmetry} = \frac{\text{Rear Peak }RV_{\frac{1}{2}Peak\ maximum} - RV_{Peak\ Maximum}}{RV_{Peak\ Maximum} - \text{Front }RV_{\frac{1}{10}Peak\ maximum}},$$

where RV is the retention volume in milliliters. The plate count of the chromatographic system must be above 24,000 and the symmetry must be less than 1.25.

The Systematic Approach for the determination of multi-detector offsets was done in a manner consistent with that published by Balke, Mourey, et. al (Mourey and Balke, Chromatography Polym. Chpt 12, (1992)) (Balke, Thitiratsakul, Lew, Cheung, Mourey, Chromatography Polym. Chpt 13, (1992)), optimizing dual detector log results, from Dow broad polystyrene 1683, to the narrow standard column calibration, results from the narrow standards calibration curve using in-house software. The molecular weight data for off-set determination was obtained in a manner consistent with that published by Zimm (Zimm, B. H., J. Chem. Phys., 16, 1099 (1948)) and Kratochvil (Kratochvil, P., Classical Light Scattering from Polymer Solutions, Elsevier, Oxford, N.Y. (1987)). The overall injected concentration used for the determination of the molecular weight was obtained from the sample refractive index area and the infra-red detector calibration from a linear polyethylene homopolymer of 120,000 g/mol molecular weight. The chromatographic concentrations were assumed low enough to eliminate addressing 2nd Virial coefficient effects (concentration effects on molecular weight). The Log (molecular weight) elution obtained by Light Scattering of the linear homopolymer reference material should be consistent with the conventional GPC as described above. Decane was included (via GPC-IR micropump) with each calibration and sample run and was used to provide flowrate referencing for each sample run back to the original calibration curve.

The calculation of the cumulative detector fractions (CDF) for the infra-red measurement channel ("CDF IR")

the viscometer detector ("CDF DV") and the low angle laser light scattering detector ("CDF LS") are accomplished by the following steps:

1) Linearly flow correct the chromatogram based on the relative retention volume ratio of the air peak between the sample and that of a consistent narrow standards cocktail mixture.
2) Correct the light scattering detector and viscometer detector offset relative to the refractometer as described in the calibration section.
3) Subtract baselines from the light scattering, viscometer, and refractometer chromatograms and set integration windows making certain to integrate all of the low molecular weight retention volume range in the light scattering and viscometer chromatograms that is observable from the refractometer chromatogram.
4) Calculate the molecular weights at each data slice based on the polystyrene calibration curve, modified by the polystyrene to polyethylene conversion factor (0.41) as described in the calibration section.
5) Calculate the Area Detector Fraction (ADF) of each chromatogram ($ADF_{IR}$, $ADF_{DV}$, and $ADF_{LS}$) as the chromatographic area between two desired GPC molecular weight points as described by their retention volumes as follows:

$$ADF = \frac{\sum_{j=RV \text{ at } Log(Mgpc) \text{ of Highest M Desired}}^{i=RV \text{ at } Log(Mgpc) \text{ of Lowest M Desired}} H_j}{\sum_{j=RV \text{ at } Log(Mgpc) \text{ of Highest M Integrated}}^{i=RV \text{ at } Log(Mgpc) \text{ of Lowest M Integrated}} H_j}.$$

Therefore, the ADF is defined as the area of the integrated chromatogram in response×retention volume within a desired range of GPC molecular weights divided by the entire area of the integrated chromatogram. If the desired molecular weight is outside the integrated area of the chromatogram, then any area slices of the desired molecular weight beyond that point is equivalent to zero; thus the ADF numerator represents the intersection of the desired range with the full chromatographic integrated area range.

6) Likewise a plot of a cumulative detector fraction, CDF, versus molecular weight may be obtained by calculating the ADF at each integrated retention volume (i) from the highest molecular weight limit (lowest integrated retention volume) to each integrated retention volume until the lowest molecular weight limit is reached. In such a manner, the CDF can be plotted from 0 to 1 and the area fraction of the desired chromatogram (ADF) can be read as the difference between the two CDF values.

$$CDF_i = \frac{\sum_{j=RV \text{ at } Log(Mgpc) \text{ of Highest M Integrated}}^{i=RV \text{ at } Log(Mgpc) \text{ of M Desired}} H_j}{\sum_{j=RV \text{ at } Log(Mgpc) \text{ of Highest M Integrated}}^{i=RV \text{ at } Log(Mgpc) \text{ of Lowest M Integrated}} H_j}$$

Therefore, the $CDF_i$ is the fraction of the total integrated chromatographic area with a GPC molecular weight greater than a desired value expressed as GPC molecular weight.

The desired composition has an ADF IR, of less than, or equal to, 15,000 g/mol GPC molecular weight, of greater than or equivalent to 0.23 and less than or equivalent to 0.26. FIG. 1 shows an example of the Inventive Examples 1-3 against Comparative Example 1. All of the inventive compositions show at least 23% of the concentration distribution are ≤15,000 GPC molecular weight allowing for excellent processability of the resin.

Figure 2:
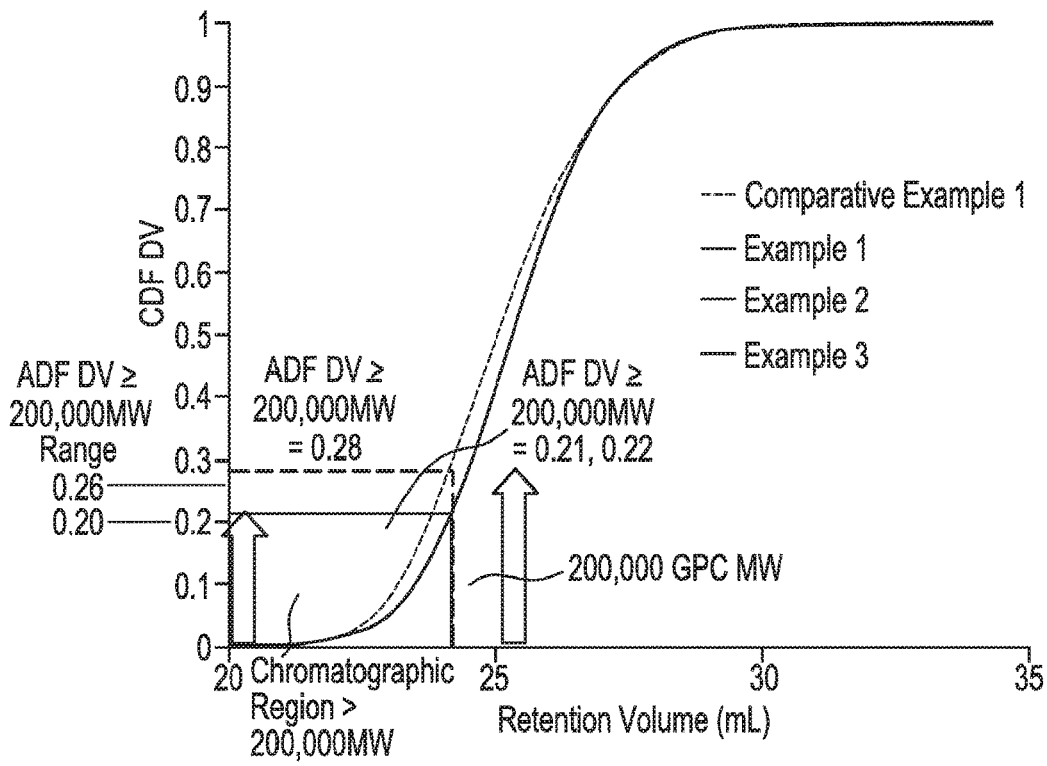
FIG. 2 is a CDF visualization of the viscosity (DV) fraction (ADF) at ≥200,000 g/mol GPC molecular weight of the polymer.

Because it is necessary to maintain some long chains to enhance melt strength of a resin, and the viscometer is useful to determine if there is a sufficient presence of such materials; we therefore examine the CDF DV at ≥200,000 g/mol GPC molecular weight. This indicates chains that are sufficiently long enough for entanglements, but are generally not crosslinked to a degree that may be detrimental to optical properties. We have found that polymer molecules having an ADF fraction (at ≥200,000 g/mol MW) of at least 0.20 are sufficient for this criteria (at least 20% of the viscometer chromatogram lies at ≥200,000 g/mol GPC molecular weight) (FIG. 2). As the amount of long-chains becomes excessive, resin viscosity rises and thus processing can be become impacted. We have found that resins having an ADF less than or equivalent to 0.26 are optimum (particularly for the claimed melt index range). Furthermore, the intrinsic viscosity should remain relatively low, in the range from 0.77 to 0.84 dL/g as measured by the inline GPC viscometer for optimal processing.

Figure 3:
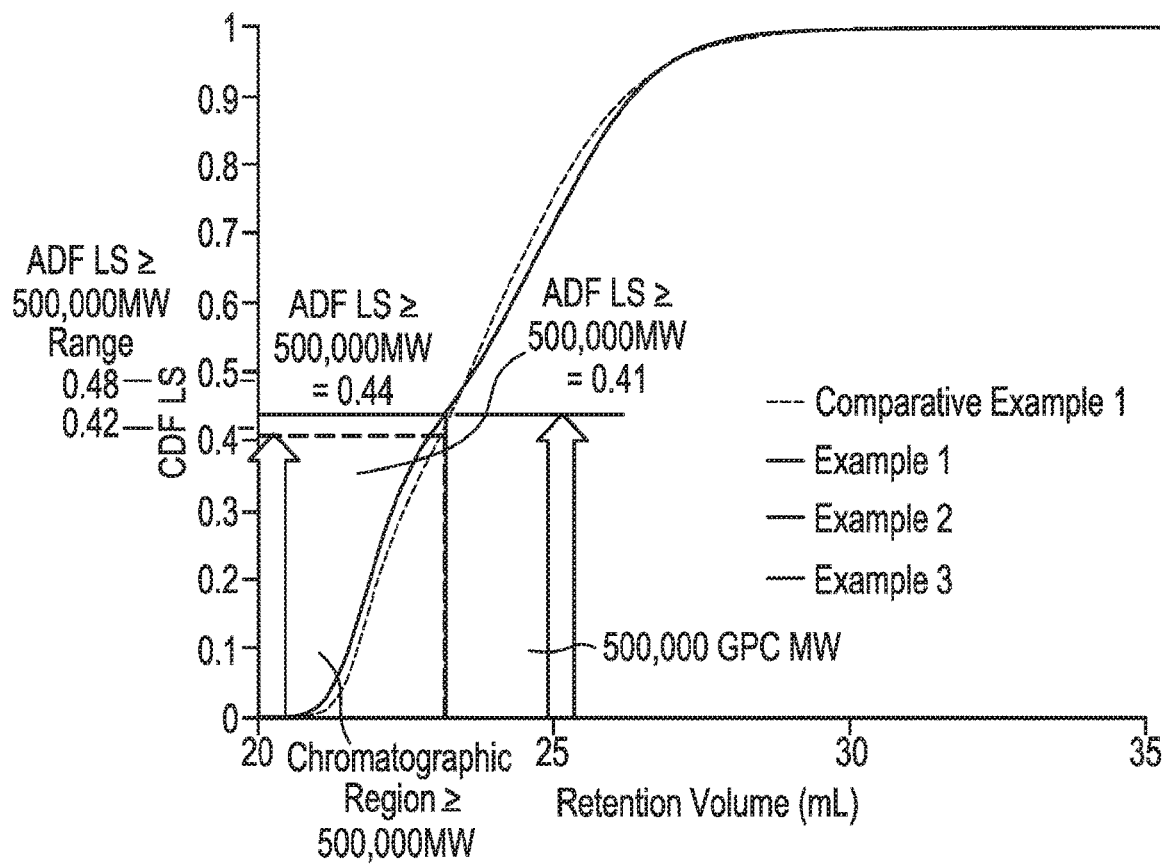
FIG. 3 is a CDF visualization of the light scattering (LS) fraction (ADF) at ≥500,000 g/mol GPC molecular weight of the polymer.

The high molecular weight material must furthermore possess enough branched arms which are detected well by the light scattering detector. We therefore desire a large enough very-high molecular weight fraction (ADF LS (at ≥500,000 g/mol GPC molecular weight) of at least 0.42). Thus 42% of the light scattering chromatogram (2500,000 g/mol GPC molecular weight) is particularly advantaged. Of note, there is a limit to the amount of very-highly branched material, and it is believed that this material should be kept at, or below, 48%, for ADF ≥500,000 g/mol GPC molecular weight, in this particular melt index range, to avoid complications with gels. The optimum ADF LS (2500,000 g/mol GPC molecular weight) lies from 0.42 to 0.48 (FIG. 3). Moreover, a target range for absolute molecular weight by light scattering, which is proportional to the total backbone and branch molecular weight, lies from 145,000 to 170,000 g/mol. This value can be obtained directly by the concentration-normalized area of the calibrated 15 degree light scattering channel.

Differential Scanning calorimetry (DSC)

Differential Scanning calorimetry (DSC) can be used to measure the melting and crystallization behavior of a polymer over a wide range of temperatures. For example, the TA Instruments Q2000 DSC, equipped with a refrigerated cooling system (RCS) and an autosampler is used to perform this analysis. During testing, a nitrogen purge gas flow of 50 ml/min is used. Each sample is melt pressed into a thin film at about 190° C.; the melted sample is then air-cooled to room temperature (~25° C.). The film sample was formed by pressing a "0.5 to 0.9 gram" sample at 190° C. at 20,000 $lb_f$ (0.0890 MN) and 10 seconds, to form a "0.1 to 0.2 mil thick" film. A 3-10 mg, six mm diameter specimen was extracted from the cooled polymer, weighed, placed in an aluminum pan (about 50 mg), and crimped shut. Analysis was then performed to determine its thermal properties.

The thermal behavior of the sample was determined by ramping the sample temperature up and down to create a heat flow versus temperature profile. First, the sample was rapidly heated to 180° C., and held isothermal for five minutes, in order to remove its thermal history. Next, the sample was cooled to −40° C., at a 10° C./minute cooling rate, and held isothermal at −40° C. for five minutes. The sample was then heated to 150° C. (this is the "second heat" ramp) at a 10° C./minute heating rate. The cooling and second heating curves are recorded. The cooling curve was analyzed by setting baseline endpoints from the beginning of crystallization to −20° C. The heating curve was analyzed by setting baseline endpoints from −20° C. to the end of melting. The values determined were peak melting temperature (Tm), peak crystallization temperature (Tc), heat of fusion (Hf) (in Joules per gram), and the calculated % crystallinity for ethylene-based polymer samples using the following equations: % Crystallinity=((Hf)/(292 J/g))×100 (EQN 14). The heat of fusion and the peak melting temperature are reported from the second heat curve. The peak crystallization temperature is determined from the cooling curve.

EXPERIMENTAL

Preparation of Inventive Ethylene-Based Polymers

Figure 4:
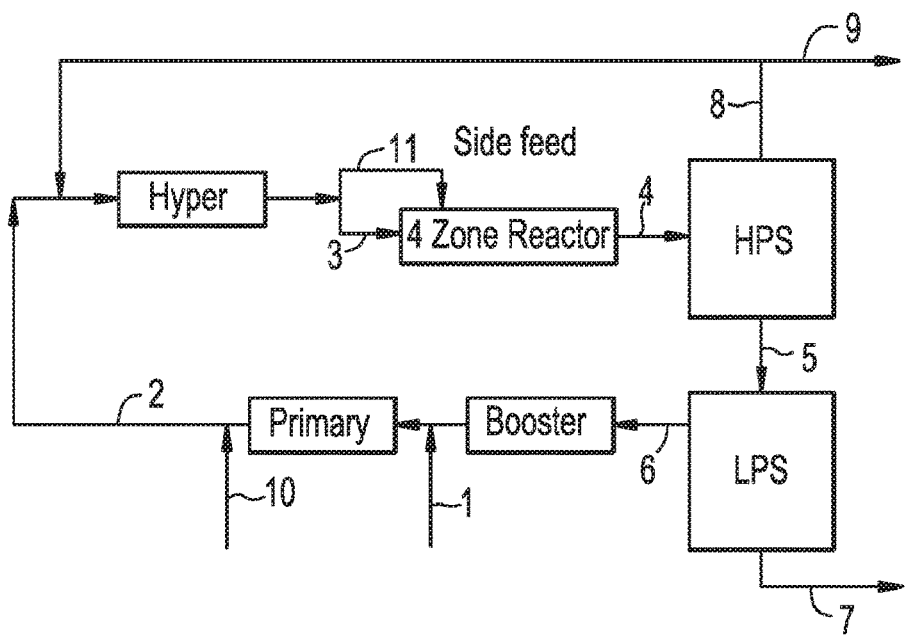
FIG. 4 is a block diagram of a process reaction system used to produce the inventive ethylene-based polymers.

FIG. 4 is a block diagram of the process reaction system used to produce the inventive ethylene-based polymers (LDPEs). The process reaction system in FIG. 4 is a partially closed-loop, dual recycle, high-pressure, low density polyethylene production system. The process reaction system is comprised of a fresh ethylene feed line [1], a booster and primary compressor ("Primary"), a hypercompressor ("Hyper") and a four zone tubular reactor ("4 Zone reactor"). Stream [3] is heated by a "Pre-heater" to a sufficiently high temperature, and fed to the front of the reactor. Stream [11] is fed as a side stream to the reactor. In the reactor, polymerization is initiated with the help of four mixtures, each containing one or more free radical initiation systems (see Table 1), which are injected at the inlet of each reaction zone (not shown).

The maximum temperature in each reaction zone is controlled at a set point, by regulating the feed amount of the mixture of initiators at the start of each reaction zone. Each reaction zone has one inlet and one outlet. Each inlet stream consists of the outlet stream from the previous zone and/or added ethylene-rich feed stream. Upon completing the polymerization, the reaction mixture is depressurized and cooled in stream [4]. The process further consists of a high pressure separator "HPS," which separates the reaction mixture into an ethylene rich stream [8], which is cooled and recycled back to the suction of the hyper, and a polymer rich stream [5], which is sent to the low pressure separator "LPS" for further separation. In the LPS, the ethylene rich stream is cooled, and recycled back to the booster ("Booster") in stream [6]. From the booster, the ethylene is compressed further by the primary compressor. Feed [2] is then recycled to the suction of the hypercompressor. The polymer leaving the LPS [7] is further pelletized and purged. The chain transfer agent "CTA" feed [10] is injected into the ethylene stream at the discharge of the primary compressor. Stream [9] is a purge stream used to remove impurities and/or inerts. Cooling jackets (using high pressure water) are mounted around the outer shell of the tube reactor and pre-heater.

For Inventive Examples 1-3, a mixture containing t-butyl peroxy-2 ethylhexanoate (TBPO), tert-butyl peroxyacetate (TBPA), and an iso-paraffinic hydrocarbon solvent (boiling range 171-191° C.; for example, ISOPAR H) was used as the initiator mixture for the first reaction zone. For the second reaction zone, a mixture containing di-tert-butyl peroxide (DTBP), TBPO, TBPA, and the iso-paraffinic hydrocarbon solvent was used. For the third and fourth reaction zones, a mixture of TBPA, DTBP, and iso-paraffinic hydrocarbon solvent was used. This data is summarized in Table 1. Propylene was used as the CTA. The concentration of the CTA fed to the process was adjusted to control the melt index of the product. Table 2 shows that the polymerization conditions used to form the inventive samples.

TABLE 1

Peroxide (PO) initiator flows, in pounds per hour, at each injection point

| Injection Point | Initiator | Ex. 1 Neat PO lbs/hour | Ex. 2 Neat PO lbs/hour | Ex. 3 Neat PO lbs/hour |
|---|---|---|---|---|
| #1 | TBPO | 0.95 | 1.12 | 1.01 |
| #1 | TBPA | 0.41 | 0.48 | 0.43 |
| #2 | TBPO | 4.76 | 5.46 | 5.6 |
| #2 | TBPA | 1.02 | 1.17 | 1.2 |
| #2 | DTBP | 1.02 | 1.17 | 1.2 |
| #3 | TBPA | 0.54 | 0.54 | 0.54 |
| #3 | DTBP | 1.26 | 1.26 | 1.26 |
| #4 | TBPA | 0.43 | 0.43 | 0.43 |
| #4 | DTBP | 1.01 | 1.01 | 1.01 |

TABLE 2

Process conditions used to polymerize Examples

| Process Variables | Ex 1 | Ex. 2 | Ex. 3 |
|---|---|---|---|
| Reactor Pressure (Psig) | 38,524 | 38,550 | 38,500 |
| Zone 1 Initiation T (° C.) | 152 | 151 | 151 |
| Zone 1 Peak T (° C.) | 250 | 252 | 252 |
| Zone 2 Initiation T (° C.) | 156 | 161 | 161 |
| Zone 2 Peak T (° C.) | 290 | 291 | 291 |
| Zone 3 Initiation T (° C.) | 240 | 239 | 239 |
| Zone 3 Peak T (° C.) | 290 | 291 | 291 |
| Zone 4 Initiation T (° C.) | 221 | 220 | 220 |
| Zone 4 Peak T (° C.) | 283 | 283 | 283 |
| Fresh ethylene Flow (lb/hr) | 26,483 | 29,330 | 28,993 |
| Ethylene Throughput to Reactor (lb/hr) | 100,350 | 100,180 | 100,350 |
| Ethylene Conversion (%) | 27.7 | 27.8 | 27.7 |
| Propylene Flow (lb/hr) | 581 | 579 | 580 |
| Ethylene Purge Flow (lb/hr) | 295 | 302 | 296 |
| Recycle Prop Conc. (% Vol) | 2.1 | 2.1 | 2.1 |
| Pre-heater T (° C.) | 201 | 201 | 201 |
| Reactor Cooling System 1 (° C.) | 167 | 167 | 167 |
| Reactor Cooling System 2 (° C.) | 164 | 164 | 164 |

Properties of Example 1 to Example 3 and Comparative Examples LDPE 751A and 586A are listed in Tables 3-10. Table 3 contains the melt index (I2), density, melt strength, and wt % hexane extractables. Tables 4 to 6 contain the results from the triple detector gel permeation chromatography (TDPGC). The inventive examples show good MS and hexane extractable levels, similar to those of LDPE 751A and LDPE 586A.

Table 7 contains the DMS viscosity data, as summarized by the following: the viscosities measured at 0.1, 1, 10, and 100 rad/s; the viscosity ratio or the ratio of the viscosity measured at 0.1 rad/s to the viscosity measured at 100 rad/s, each measured at 190° C.; and the tan delta measured at 0.1 rad/s and 190° C. Inventive Examples 1-3 have a similar viscosity ratio (V0.1/V100) as that of the higher melt index comparative example LDPE 751A, indicating improved processability for the inventive Examples, even at lower I2 values.

Table 8 contains the branches per 1000C as measured by $^{13}$C NMR. These polymers contain amyl, or C5 branches, which are not contained in substantially linear polyethylenes, such as AFFINITY Polyolefin Plastomers, or LLDPE, such as DOWLEX Polyethylene Resins, both produced by The Dow Chemical Company. Example 1-Example 3 contain C1 branches since propylene was used as the chain transfer agent (CTA) as shown in Table 2. Example 1-Example 3 also show distinction, in particular Example 1-Example 3 show lower levels of C4 branches, lower levels of C5 branches, and lower levels of C6+ branches than the Comparative Examples, LDPE 751A and LDPE 586A.

Table 9 contains unsaturation results by $^1$H NMR. Again, differentiation is seen between Example 1-Example 3 and the Comparative Examples. Example 1-Example 3 contain higher levels of vinyl/1000C, lower levels of trisubstituted/1000C and higher levels of total unsaturations. Table 10 contains the DSC results, including melting point (Tm), the heat of fusion, the percent crystallinity, and the crystallization point.

The inventive compositions provide the proper balance of ADF IR value, molecular weight distribution and melt index (I2), and process well into useful cast films and thicker cast sheets. If the ADF IR value of the ethylene-based polymer is less than 0.230, the composition typically becomes more difficult to extrude into a cast film or sheet, because the amount of low molecular weight polymer chains, in the polymer sample, becomes too low to promote good polymer flow. If the ADF IR value of the ethylene-based polymer is greater than 0.260, too much low molecular weight material is present in the polymer sample, and this can lead to an increase in the level of low molecuar weight extractables. If the MWD(conv) (Mw/Mn (cony)) value of the polymer less than 3.0, typically the polymer is more difficult to extrude into a cast film or sheet. If the MWD(conv) of the polymer is greater than 7.0, this will typically result in reduced mechanical properties of the cast film or sheet, such as toughness (tear strength, puncture resistance and dart impact strength). If the I2 value of the polymer is less than 4.0, it is typically more difficult to extrude the polymer into a cast film or sheet. If the I2 value of the polymer is greater than 6.5, this will typically result in reduced mechanical properties of the cast film or sheet, such as toughness (tear strength, puncture resistance and dart impact strength).

TABLE 3

Melt Index (I2), Density, Melt Strength (MS), and wt % Hexane Extractables

| Sample | I2 (Melt Index) | Density (g/cc) | Melt Strength (cN) | % Hexane Extractables |
|---|---|---|---|---|
| Ex. 1 | 5.3 | 0.9201 | 2.8 | 2.1 |
| Ex. 2 | 5.6 | 0.9203 | 2.8 | 2.2 |
| Ex. 3 | 5.5 | 0.9202 | 2.7 | 2.2 |
| LDPE 751A* | 6.4 | 0.9250 | 2.5 | 2.2 |
| LDPE 586A* | 3.0 | 0.9210 | 5.2 | 2.1 |

*Commercially available from The Dow Chemical Company.

TABLE 4

TDGPC-Related Properties

| Sample | Mn (conv) (g/mol) | Mw (conv) (g/mol) | Mz (conv) (g/mol) | Mw/Mn (conv) |
|---|---|---|---|---|
| Ex. 1 | 14,200 | 74,200 | 314,300 | 5.24 |
| Ex. 2 | 15,200 | 74,100 | 310,400 | 4.88 |
| Ex. 3 | 15,000 | 74,600 | 317,300 | 4.98 |
| LDPE 751A | 14,000 | 80,300 | 299,300 | 5.73 |
| LDPE 586A | 16,300 | 82,000 | 330,900 | 5.03 |

TABLE 5

TDGPC-Related Properties

| Sample | Mw (abs) (g/mol) | Mz (abs) (g/mol) | Mz (abs)/ Mw(abs) | Mw (abs)/ Mw(conv) | LCB$_f$ | gpcBR |
|---|---|---|---|---|---|---|
| Ex. 1 | 160,900 | 3,464,000 | 21.53 | 2.17 | 1.23 | 1.77 |
| Ex. 2 | 161,700 | 3,720,000 | 23.01 | 2.18 | 1.32 | 1.74 |
| Ex. 3 | 165,500 | 3,636,000 | 21.97 | 2.22 | 1.97 | 1.75 |
| LDPE 751A | 170,300 | 3,228,000 | 18.95 | 2.12 | 2.71 | 1.73 |
| LDPE 586A | 172,500 | 3,886,000 | 22.53 | 2.10 | 1.24 | 1.73 |

TABLE 6

TDGPC-Related Properties

| Sample | ADF IR (MW ≤ 15,000 g/mol) | ADF LS (MW ≥ 500,000 g/mol) | ADF DV (MW ≥ 200,000 g/mol) | Intrinsic viscosity dl/g |
|---|---|---|---|---|
| Ex. 1 | 0.251 | 0.435 | 0.216 | 0.811 |
| Ex. 2 | 0.249 | 0.440 | 0.210 | 0.816 |
| Ex. 3 | 0.246 | 0.435 | 0.212 | 0.815 |
| LDPE 751A | 0.263 | 0.410 | 0.280 | 0.829 |
| LDPE 586A | 0.230 | 0.436 | 0.251 | 0.858 |

TABLE 7

Viscosities in Pa·s, Viscosity Ratio, and Tan Delta, all at 190° C.

| | I2 | Visc 0.1 rad/s | Visc 1 rad/s | Visc 10 rad/s | Visc 100 rad/s | Visc Ratio V0.1/V100 | Tan Delta 0.1 rad/s |
|---|---|---|---|---|---|---|---|
| Ex. 1 | 5.3 | 2,572 | 1,970 | 971 | 339 | 7.6 | 10.5 |
| Ex. 2 | 5.6 | 2,505 | 1,937 | 964 | 339 | 7.4 | 11.1 |
| Ex. 3 | 5.5 | 2,470 | 1,901 | 944 | 332 | 7.4 | 10.6 |
| LDPE 751A | 6.4 | 2,298 | 1,728 | 845 | 294 | 7.8 | 10.2 |
| LDPE 586A | 3.0 | 4,956 | 3,221 | 1,366 | 427 | 11.6 | 5.7 |

TABLE 8

Branching Results by $^{13}$C NMR per 1000C

| Sample | C1 | 1,3 diethyl branches | C2 on Quat Carbon | C4 | C5 | C6+ |
|---|---|---|---|---|---|---|
| Ex. 1 | 4.77 | 3.19 | 0.89 | 5.61 | 1.88 | 2.9 |
| Ex. 2 | 4.76 | 3.01 | 1.06 | 5.64 | 1.94 | 3.1 |
| Ex. 3 | 4.85 | 2.96 | 1.13 | 5.51 | 1.72 | 3.1 |
| LDPE 751A | ND | 2.99 | 1.02 | 6.24 | 2.10 | 3.6 |
| LDPE 586A | 3.6 | 3.31 | 1.18 | 6.23 | 2.00 | 3.5 |

ND = Not Detected

TABLE 9

Unsaturation Results by $^1$H NMR

| Sample | vinyl/ 1000C | cis and trans/ 1000C | trisub/ 1000C | vinylidene/ 1000C | total unsat/ 1000C |
|---|---|---|---|---|---|
| Ex. 1 | 0.323 | 0.056 | 0.062 | 0.126 | 0.57 |
| Ex. 2 | 0.314 | 0.053 | 0.048 | 0.121 | 0.53 |
| Ex. 3 | 0.318 | 0.057 | 0.059 | 0.126 | 0.56 |
| LDPE 751A | 0.097 | 0.133 | 0.094 | 0.133 | 0.46 |
| LDPE 586A | 0.254 | 0.058 | 0.066 | 0.128 | 0.31 |

TABLE 10

| | | DSC Results | | |
|---|---|---|---|---|
| Sample | $T_{m1}$ (° C.) | Heat of Fusion (J/g) | % Cryst. | $T_{cl}$ (° C.) |
| Ex. 1 | 107.8 | 147.6 | 50.5 | 96.1 |
| Ex. 2 | 107.7 | 144.7 | 49.6 | 96.3 |
| Ex. 3 | 107.7 | 146.5 | 50.2 | 96.2 |
| LDPE 751A | 112.9 | 151.6 | 51.9 | 95.8 |
| LDPE 586A | 108.2 | 145.3 | 49.8 | 95.8 |

The invention claimed is:

1. A composition comprising an ethylene-based polymer which comprises the following properties:
  a) Molecular Weight Distribution (MWD(conv)) from 3.0 to 7.0 as measured according to conventional Gel Permeation Chromatography (GPC);
  b) an infra-red Area Detector Fraction (ADF IR) from 0.230 to 0.260 for molecular weight ≤15,000 g/mol as measured according to GPC using an infra-red detector;
  c) a melt index ($I_2$) from 4.0 to 6.5 g/10 min as measured in accordance with ASTM D 1238-10, Condition 190° C./2.16 kg, Procedure B.

2. The composition of claim 1, wherein the ethylene-based polymer further comprises
  d) a light scattering ADF LS from 0.420 to 0.480 for molecular weight ≥500,000 g/mol as measured according to GPC using a light scattering detector.

3. The composition of claim 1, wherein the ethylene-based polymer further comprises a viscosity ADF DV from 0.200 to 0.260 for molecular weight ≥200,000 g/mol as measured according to GPC using viscosity detector.

4. The composition of claim 1, wherein the ethylene-based polymer further comprises an absolute weight averaged molecular weight Mw(abs) from 145,000 g/mol to 180,000 g/mol, wherein the absolute weight averaged molecular weight Mw(abs) is measured according to GPC using a light scattering detector.

5. The composition of claim 1, wherein the ethylene-based polymer has a density from 0.910 to 0.925 g/cc.

6. The composition of claim 1, wherein ethylene-based polymer comprises an ADF DV ≥0.18, for molecular weight >200,000 g/mole.

7. The composition of claim 1, wherein ethylene-based polymer has a peak melting temperature (Tm) from 100 to 120° C.

8. The composition of claim 1, wherein the ethylene-based polymer is a LDPE.

9. An article comprising at least one component formed from the composition of claim 1.

10. A multilayer film comprising at least one layer formed from the composition of claim 1.

* * * * *